United States Patent [19]

Breyer et al.

[11] Patent Number: 5,625,957
[45] Date of Patent: May 6, 1997

[54] COORDINATE MEASURING APPARATUS HAVING A PROBE IN THE FORM OF A SOLID-STATE OSCILLATOR

[75] Inventors: Karl H. Breyer, Heidenheim; Helmut Heier; Gerhard Meyer, both of Aalen, all of Germany

[73] Assignee: Carl-Zeiss-Stiftung, Heidenheim, Germany

[21] Appl. No.: 436,387
[22] PCT Filed: Aug. 23, 1994
[86] PCT No.: PCT/EP94/02788
 § 371 Date: May 15, 1995
 § 102(e) Date: May 15, 1995
[87] PCT Pub. No.: WO93/08093
 PCT Pub. Date: Mar. 23, 1995

[30] Foreign Application Priority Data

Sep. 13, 1993 [DE] Germany ............. 43 31 069.9

[51] Int. Cl.$^6$ ................................. G01B 7/004
[52] U.S. Cl. ................................. 33/503; 33/559
[58] Field of Search ................ 33/1 M, 503, 504, 33/505, 556, 557, 558, 559, 560, 561; 73/649, 651, 658, 662

[56] References Cited

U.S. PATENT DOCUMENTS

| | | |
|---|---|---|
| 3,795,054 | 3/1974 | Kinney ............. 33/505 |
| 4,397,188 | 8/1983 | Bansevichus et al. ............. 73/651 |
| 4,629,957 | 12/1986 | Walters et al. ............. 73/651 |
| 4,882,848 | 11/1989 | Breyer et al. ............. 33/559 |
| 5,189,806 | 3/1993 | McMurtry et al. ............. 33/503 |
| 5,247,751 | 9/1993 | Ohya et al. ............. 33/558 |
| 5,471,406 | 11/1995 | Breyer et al. ............. 33/503 |
| 5,517,124 | 5/1996 | Rhoades et al. ............. 33/503 |

FOREIGN PATENT DOCUMENTS

| | | |
|---|---|---|
| 0605140 | 7/1994 | European Pat. Off. . |
| 8023047 | 5/1981 | France . |
| 9115942 | 7/1992 | Germany . |
| 9213059 | 2/1993 | Germany . |
| 4204602 | 8/1993 | Germany . |
| 4243284 | 6/1994 | Germany . |
| 2070249 | 9/1981 | United Kingdom . |
| WO89/00672 | 1/1989 | WIPO . |
| WO92/08102 | 5/1992 | WIPO . |

*Primary Examiner*—G. Bradley Bennett
*Attorney, Agent, or Firm*—Walter Ottesen

[57] ABSTRACT

The solid-state oscillator, preferably a watch crystal (1/2), is mounted with its direction (S) of vibration at an angle to all three measuring directions (x, y, z) of the coordinate measuring apparatus. The oscillator circuit of the solid-state oscillator is connected to an electronic circuit which generates two different contact signals. Both measures make it possible to reduce the dependency of the contact uncertainty of the measuring direction.

6 Claims, 4 Drawing Sheets

PRIOR ART

COORDINATE MEASURING APPARATUS HAVING A PROBE IN THE FORM OF A SOLID-STATE OSCILLATOR

BACKGROUND OF THE INVENTION

In recent times, probes for coordinate measuring apparatus have become known which apply only a very slight measuring force of less than 1 mN to the workpiece to be measured. These probes operate with a so-called solid-state oscillator having an amplitude of vibration which changes when approaching the object to be measured. Such a probe is disclosed in German utility model 9,213,059.

This known probe has a thin glass rod as a probe element which is attached with adhesive to a prong of a tuning fork crystal in such a manner that the longitudinal axis of the glass rod is aligned parallel to the direction of vibration of the tuning fork crystal.

When a probe of this kind is used in a coordinate measuring apparatus and when the longitudinal axis of the rod or probe element is aligned parallel to one of the measuring directions of the coordinate measuring apparatus as shown in FIG. 1, it can then be determined that the attainable contact uncertainties in the coordinate direction z (that is, in the longitudinal direction of the rod 3a and parallel to the direction S of vibration of the tuning fork crystal) are significantly less than the contact uncertainties which are measured in the coordinate directions x and y perpendicular to the longitudinal axis of the rod 3a. The measuring uncertainties lie apart from each other by a factor of 5. While, for example, a contact uncertainty of only 1.0 μm was determined for the measuring axis z, this uncertainty amounts to about 5 μm for the contact directions x and y.

An asymmetry of this kind in the contact uncertainty is, however, unwanted because many sides must be contacted when making measurements of geometric elements such as bores, et cetera. The measurement uncertainty should correspond for all contact points to the same value specified for the measuring apparatus.

A further problem when working with the above-mentioned probe is obtaining signals which announce clearly and reliably the contact of time probe element with the workpiece to be measured to the control of the coordinate measuring apparatus. If this time point is not clearly and reproducibly determined, then this likewise increases the contact uncertainty of the probe. The circuit described in German utility model 9,213,059 does supply usable results. However, the circuit is rather sensitive to external disturbances. For example, the transfer of measured values is influenced by turbulences in the air. When such disturbances occur shortly ahead of contact on the workpiece surface, then these disturbances are not clearly recognized as disturbances and a false coordinate measuring value is supplied, that is, these disturbances contribute to an increased contact uncertainty.

SUMMARY OF THE INVENTION

In view of the above, it is an object of the invention, in a coordinate measuring apparatus having a probe of the kind referred to above, to so mount the probe or provide a circuit therefor that equal contact uncertainties reliably result, which are as low as possible, in the three measuring directions x, y and z.

In the arrangement of FIG. 2, the solid-state oscillator (1/2) is mounted with respect to the direction S of vibration at an angle of preferably 45° to all three measurement directions x, y and z of the coordinate measuring apparatus. With the arrangement shown in FIG. 2, contact uncertainties of 2.5 μm result in all three contact directions with these contact uncertainties being low and comparable. However, the sketched arrangement is disadvantageous insofar as the probe element, that is the rod 3a, is inclined to the three contact directions which are possible in the coordinate measuring apparatus. The objects O to be measured are, as a rule, clamped to the table of the coordinate measuring apparatus so as to be aligned to the measuring axes x, y and z. For this reason, measurement is improved when the probe element, that is, the rod placed on the solid-state oscillator, is aligned parallel to one of the three measuring directions of the coordinate measuring apparatus. For this reason, it is purposeful when at least the contact end of the rod is parallel to one of the measuring directions of the coordinate measuring apparatus and therefore aligned at an angle to the direction S of vibration of the solid-state body, for example, in that the rod is correspondingly angled or is attached at an angle to the solid-state oscillator without a bend.

The reliability and contact uncertainty of the above-mentioned probe can be improved utilizing an electronic circuit which generates at least two different signals characterizing the contact of the probe element with the workpiece to be measured. With the aid of the two signals occurring coincidentally in the case of contact, disturbances which could lead to erroneous contacts are effectively detected and suppressed. At this point, reference is expressly made to United States patent application Ser. No. 08/304, 709, filed Sep. 12, 1994, now U.S. Pat. No. 5,526,576, which is incorporated herein by reference. In this application, even though for another probe type, detailed embodiments for the configuration of a reliable and functionally safe electronic circuit for processing a probe signal are provided.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
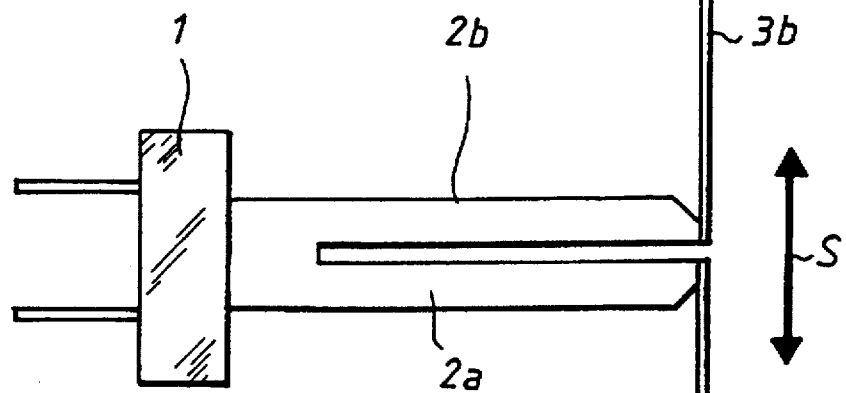
FIG. 1 is a simplified concept schematic which shows the case of the alignment of the direction S of vibration of the solid-state oscillator parallel to a measurement direction z.
Figure 1:
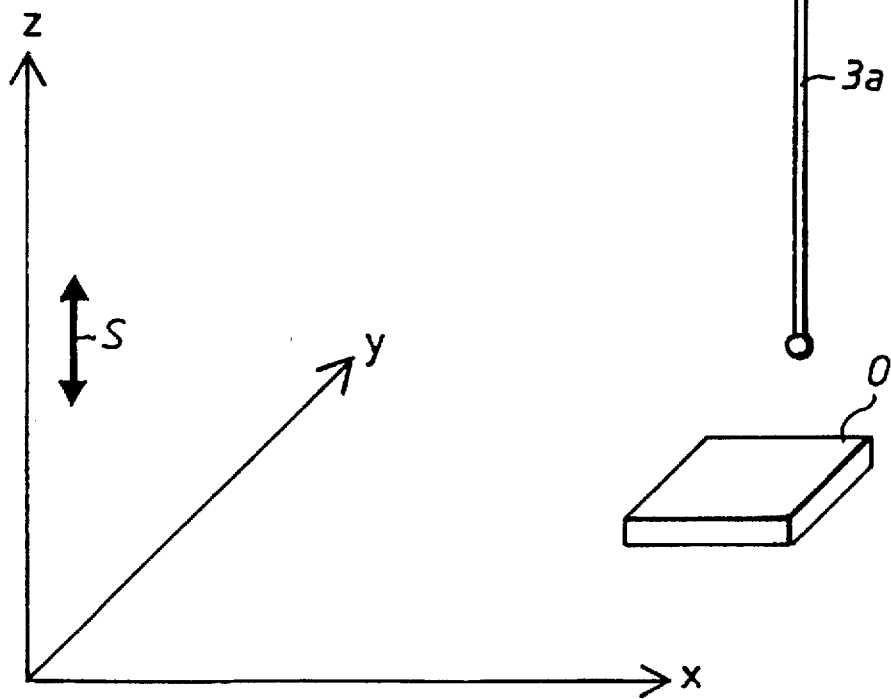

In FIG. 1, a so-called vibrating quartz probe is shown as described in a similar manner in German utility model 9,213,059. A tuning fork crystal serves as a solid-state oscillator and is, for example, also used in quartz watches. The actual fork-shaped quartz is seated in a frame 1 with the electrical terminals and thin glass rods 3a and 3b are glued to the forward ends of the prongs, respectively, of the fork. Whereas the one glass rod 3a defines the actual probe element with the ball melted onto the forward end thereof, the second rod 3b is provided to make the oscillator symmetrical. The second rod 3b is glued to the other prong 2b of the crystal and has the same size and same weight.

FIG. 1 shows the conventional alignment of the solid-state oscillator with its direction S of vibration parallel to the measurement axis z of the coordinate measuring apparatus. In this alignment in the coordinate measuring apparatus, in which the solid-state oscillator is utilized, the differences of the contact uncertainty discussed initially result referred to the measuring direction.

Figure 2:
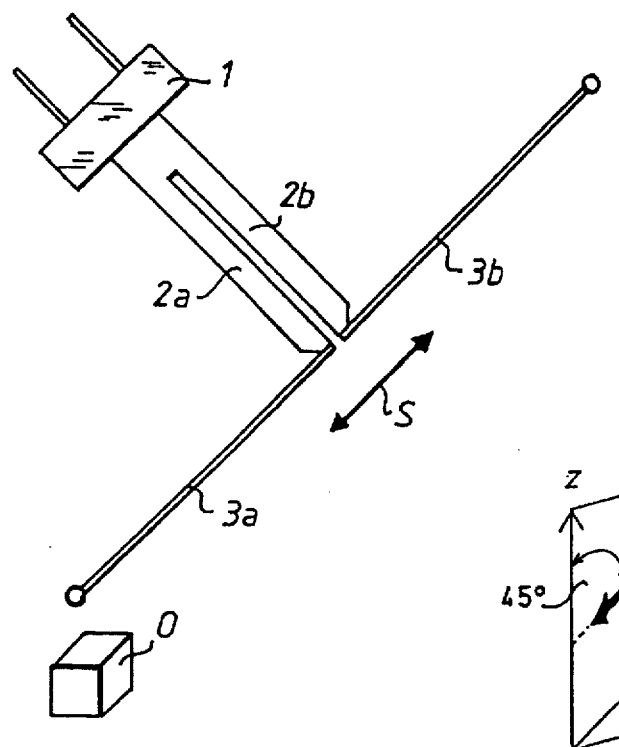
FIG. 2 is a simplified concept schematic which shows the case of the alignment of the solid-state oscillator at an angle to all three measurement axes in accordance with a first embodiment of the invention.

These asymmetries are avoided according to the invention with the arrangement of the solid-state oscillator shown at an angle in space in FIG. 2. The tuning fork crystal is built unto the measuring arm (not shown) of the coordinate measuring apparatus so that the direction S of vibration of the two fork prongs (2a and 2b) is aligned at an angle of 45° to all three measuring axes x, y and z of the coordinate measuring apparatus. Accordingly, the same low contact uncertainties of 2.5 μm for all three measuring directions result when contacting in the three above-mentioned directions.

Figure 3:
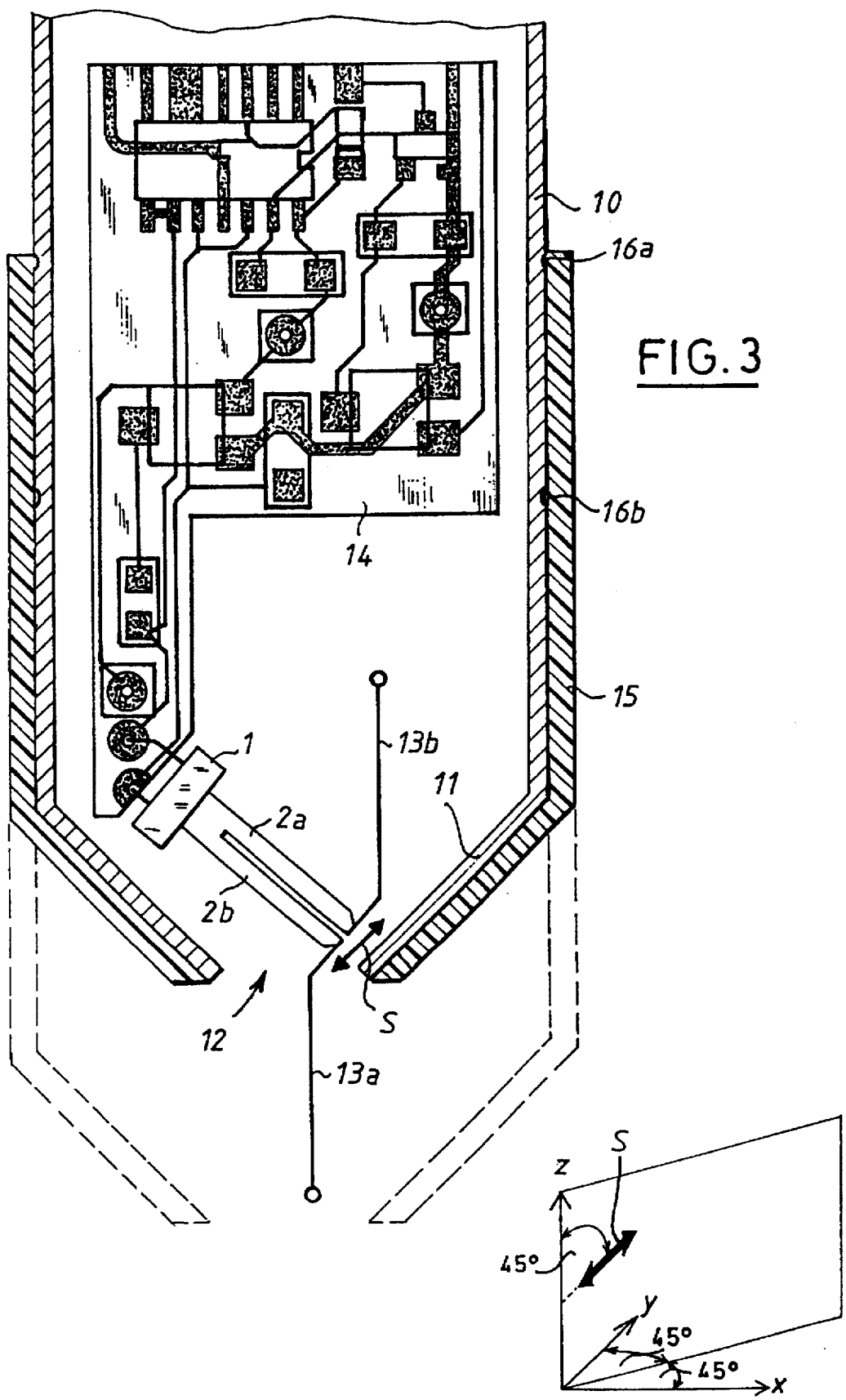
FIG. 3 is a preferred embodiment of the invention wherein the solid-state oscillator is mounted at an angle in space and a probe element arranged at an angle parallel to the measurement axis z.

In the preferred embodiment of FIG. 3, it is shown in detail how the probe is structurally configured. The probe has a cylindrical housing 10 in which the circuit board 14 is placed. The circuit board 14 has the electronic circuit for exciting the oscillator crystal and for processing the probe signal. The tuning fork crystal with its mount 1 is attached at an angle of 45° to the axis of symmetry of the housing at the lower end of the circuit board 14.

Two glass rods are attached to the two ends of the prongs (2a and 2b) of the tuning fork crystal. The larger end of the glass rods, which faces away from the tuning fork crystal, is offset parallel to the housing axis.

The lower end 11 of the housing 10 is conically configured and has a central opening 12. The contact end of the glass rod 13a passes through this central opening 12. This conical formation of the lower housing end is facilitated by the spatial angle arrangement of the tuning fork crystal and improves the accessibility when measuring with the probe in tight workpieces. The length of the glass rod 13a is limited to approximately 10 mm when using conventional watch crystals because of the maximum permissible mass for vibrations on the prongs of the tuning fork.

A plastic sleeve 15 is placed around the housing 10 and is likewise conically formed at its forward end. The plastic sleeve 15 is pushed into the position shown in phantom outline to protect the probe when not in use. Two annular slots (16a and 16b) in the housing 10 secure the housing in the two preferred positions in combination with an annular bead at the upper end of the plastic sleeve 15.

The housing 10 is so rotated when mounted in the coordinate measuring apparatus that the tuning fork (2a/2b) of the crystal and therefore the direction S of vibration lies in one plane as shown. This plane is aligned at an angle of preferably 45° to the two horizontal coordinate directions x and y.

With the probe described, the surfaces, which are usually aligned in the z-direction, and bores of workpieces are easily contacted which relates to their accessibility. At the same time, the same values for contact uncertainty result in all three coordinate directions.

Figure 4:
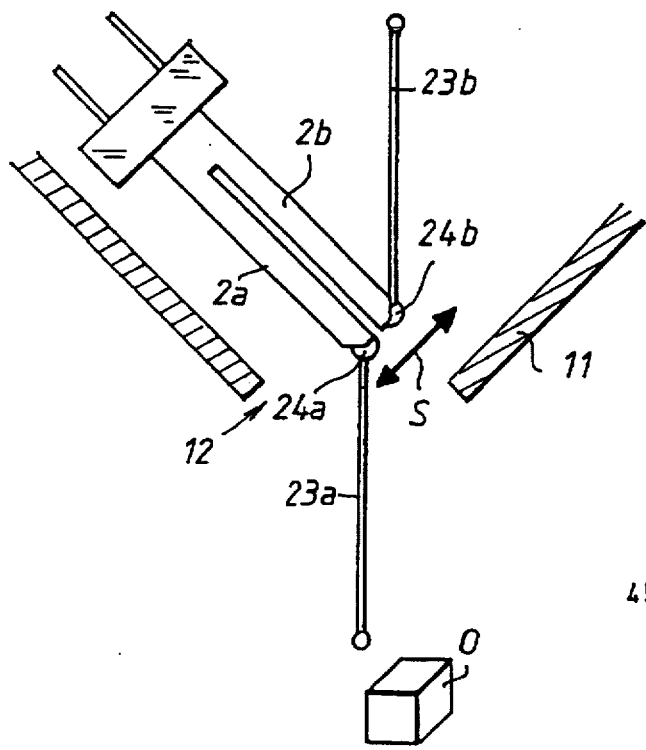
FIG. 4 shows a further embodiment of the invention having a solid-state oscillator mounted at a spatial angle and a probe element aligned parallel to the measurement axis z.

This effect can be achieved also with the somewhat modified embodiment shown in FIG. 4. Here, the two glass rods (23a and 23b) are welded at an angle to the prongs (2a and 2b) of the tuning fork crystal and are without an offset. Welding is performed either with the aid of a laser beam or an electric arc.

In both embodiments, a solid-state oscillator is shown having a single direction of vibration which is aligned at an angle to the measuring directions of the coordinate measuring apparatus. In this way, comparably large components of vibration of the probe element result in the three measuring directions.

It is, however, also possible to drive the contact element with a solid-state oscillator which vibrates simultaneously in several spatial directions or excites several vibration modes of the probe element. Comparably small contact uncertainties in all three spatial directions can then be realized when it is ensured that comparably large vibration amplitudes of the probe element result in the three spatial directions.

Figure 5:
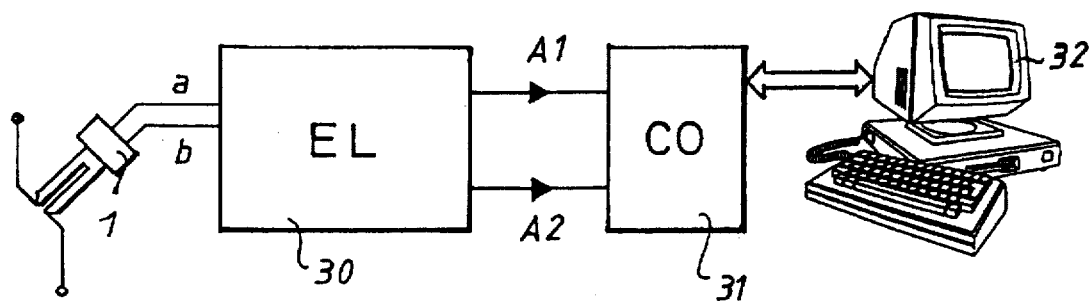
FIG. 5 is a concept schematic which shows the most essential components of the evaluation electronics connected to the solid-state oscillator.

As shown in FIG. 5, the solid-state oscillator with the connecting leads on its mount 1 is connected via lines (a) and (b) to an electronic circuit 30. As shown in connection with FIG. 6, this electronic circuit 30 includes an oscillator circuit for maintaining the vibration of the probe element as well as comparators for generating two different signals A1 and A2 when the probe element contacts the workpiece to be measured. The two signals A1 and A2 are both supplied to the control unit 31 of the coordinate measuring apparatus which, in turn, communicates via a data bus with the computer 32 of the coordinate measuring apparatus. The connections of the control unit 31 to the drives of the coordinate measuring system as well as to the length measuring systems are not shown. The length measuring systems measure the position of the movable measuring slide of the coordinate measuring apparatus in the three spatial directions x, y and z.

Figure 6:
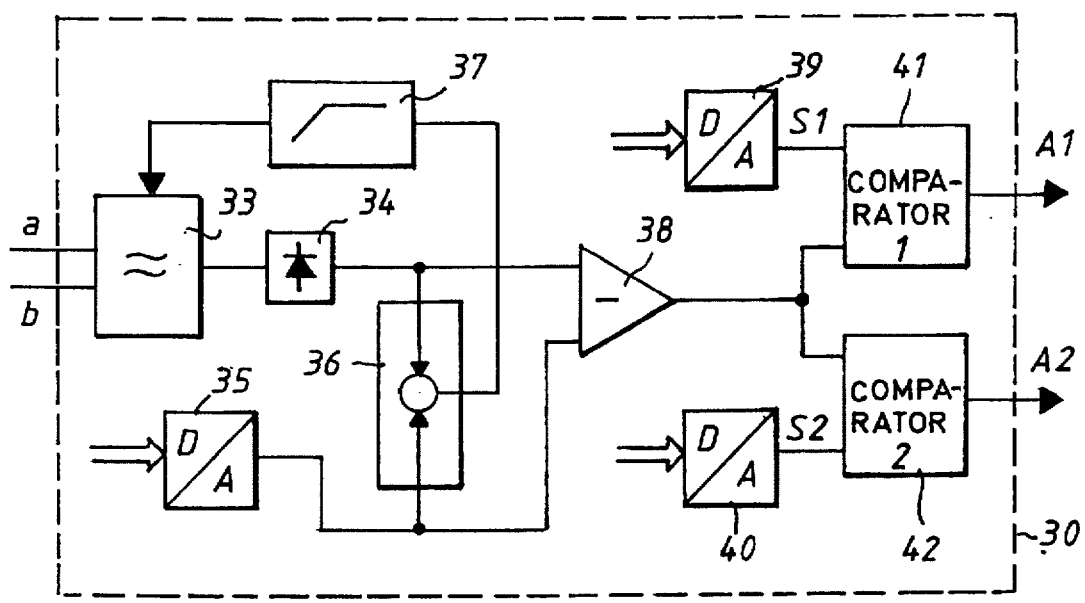
FIG. 6 is a block circuit diagram of the electronic portion 30 of FIG. 5 connected to the solid-state oscillator; and, FIG. 7 is a schematic which shows the time-dependent trace of the vibration amplitude of the solid-state oscillator during a contact operation.
Figure 7:
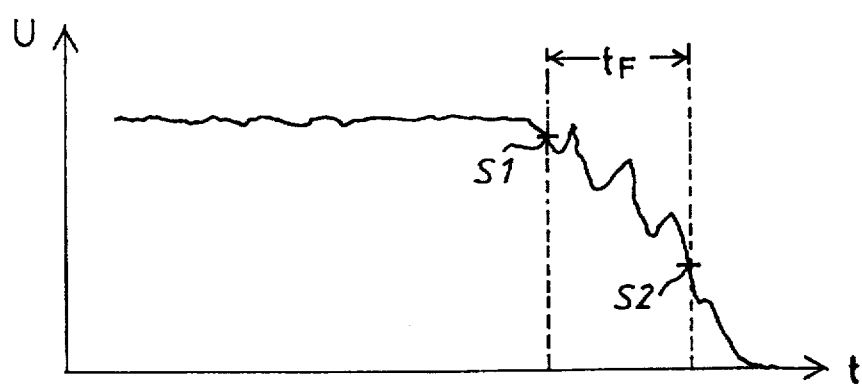

The oscillator circuit is identified in FIG. 6 by 33. The solid-state oscillator, that is, the tuning fork crystal, is driven at a constant frequency via the oscillator circuit. Furthermore, a control circuit is provided via which the amplitude of the oscillation is held constant. This circuit comprises a controller 36 to which the output signal of the digital-to-analog converter 35 is supplied as a reference variable. This desired value can be inputted either manually on the electronic circuit board 30 via a suitable manually settable microswitch array or with the aid of a microprocessor, for example, by the control unit 31 or the computer 32. The controller 36 compares the output signal of the digital-to-analog converter 35 to the actual value of the signal of the oscillator circuit 33, that is, with the amplitude of the vibration of the crystal. The signal of the oscillator circuit 33 is rectified by a rectifier 34. The corresponding control signal outputted by the controller 36 is fed back via a limiter 37 to the oscillator circuit 33. With these measures, and when approaching the surface of the workpiece to be measured, the amplitude of the vibration of the solid-state oscillator is maintained constant until the limit voltage of the limiter 37 is reached. At this time point, and when coming closer to the surface of the object, the amplitude of the vibration begins to drop because of the ever greater attenuation until the vibration finally stops altogether. This time-dependent trace of the vibration during a contact operation is shown as exemplary in FIG. 7.

To obtain a probe signal, the output of the rectifier 34 is connected to a difference amplifier 38. The other input of the difference amplifier is likewise connected to the digital-toanalog converter 35. The output of the difference amplifier 38 is supplied to the inputs of two comparators (41 and 42). The thresholds of the comparators can be likewise adjusted digitally via a microprocessor or via a manually settable microswitch array on the circuit board of the circuit 30 of FIG. 6. Two digital-to-analog converters 39 and 40 convert the adjusted threshold values to the analog inputs of the comparators (41 and 42).

The threshold value of the comparator 41 is so adjusted that a fall-off of 5% of the vibration amplitude already permits the comparator 41 to become conductive and the first contact signal A1 is generated. With this signal, the counter positions of the length measuring systems of the coordinate measuring apparatus are frozen. This signal defines the contact time point.

In contrast, the threshold S2 of the comparator 42 is set to a low value of, for example, 40% of the signal amplitude of the vibration. Correspondingly, the comparator 2 supplies a signal to the line A2 at a later time point when the vibration is attenuated more in the course of the contact operation.

The time delay between the two signals is dependent upon the contact velocity and is checked by the microprocessor in the control unit 31 as to time coincidence within a time window $t_F$ which is correlated to the contact velocity. A contact is declared to be valid only when there is a simultaneous occurrence within the above-mentioned time window. Then, the counts of the counters, which were already frozen with the first occurrence of the signal on the line A1, are adopted as contact coordinates.

In the described embodiment, the derivation of the signals A1 and A2 results from the amplitude of the vibration of the solid-state oscillator with the aid of comparators. However, it is also possible to evaluate the frequency shift on the basis of the increasing attenuation of the contact element during a contact operation. This can also be done in combination with the evaluation of the vibration amplitude. In this case, it is purposeful to provide digitally adjustable frequency filters in the evaluation electronic circuit. Likewise, it can be purposeful to make the limit voltage of the limiter 37 adjustable referred to the particular measuring task because this limit voltage primarily defines the contact of the probe element with the workpiece to be measured.

Finally, it is also possible to plot the entire time-dependent trace of the vibration amplitude and/or frequency during a contact operation in order to determine the exact contact time point and to compare the traces to stored signal traces in order to derive the exact contact coordinates therefrom. The corresponding procedure is described in DE-OS 4,204, 602 to which reference is expressly made at this point.

We claim:

1. A coordinate measuring apparatus defining three measuring directions (x, y, z), the apparatus comprising:

a solid-state oscillator having a direction (S) of vibration;

a thin rod defining a probe element and being mounted on said solid-state oscillator; and, said solid-state oscillator being mounted relative to said three measuring directions so as to cause said direction (S) of vibration to be at an angle to all three of said measuring directions, so that said direction (S) of vibration is inclined to all three of said measuring directions.

2. The coordinate measuring apparatus of claim 1, said thin rod having a first segment attached to said solid-state oscillator and a second segment defining a contacting end of said rod; and, at least said second segment extending parallel to one of said measuring directions as well as being aligned at an angle with respect to said direction (S) of vibration.

3. The coordinate measuring apparatus of claim 2, wherein said second segment is bent so as to be parallel to said measuring direction (z) and said first segment is aligned parallel to the direction (S) of said vibration.

4. The coordinate measuring apparatus of claim 1, said thin rod being linear and being attached at an angle to said solid-state oscillator.

5. The coordinate measuring apparatus of claim 2, further comprising a housing for accommodating said solid-state oscillator therein; and, said housing having a portion which is conically shaped to terminate with a central opening through which said probe element extends.

6. A coordinate measuring apparatus defining three measuring directions (x, y, z), the apparatus comprising:

a solid-state oscillator having a direction (S) of vibration;

a thin rod defining a probe element and being mounted on said solid-state oscillator; and, said solid-state oscillator be mounted relative to said three measuring directions so as to cause said direction (S) of vibration to be at an angle to all three of said measuring directions, said direction (S) of vibration being at an angle of 45° with respect to all three of said measuring directions.

* * * * *

UNITED STATES PATENT AND TRADEMARK OFFICE
CERTIFICATE OF CORRECTION

PATENT NO. : 5,625,957
DATED : May 6, 1997
INVENTOR(S) : Karl-Hermann Breyer, Helmut Heier and Gerhard Meyer It is certified that error appears in the above-identified patent and that said Letters Patent is hereby corrected as shown below:

In column 1, line 43, please delete "time" and substitute -- the -- therefor.

In column 6, line 40, please delete "be" and substitute -- being -- therefor.

Signed and Sealed this

First Day of July, 1997

Attest:

BRUCE LEHMAN

Attesting Officer

Commissioner of Patents and Trademarks